US006798151B1

United States Patent
Chou et al.

(10) Patent No.: US 6,798,151 B1
(45) Date of Patent: Sep. 28, 2004

(54) CURRENT AND CHARGE LEAKAGE BALANCING DEVICE FOR DISPLAY PANEL

(75) Inventors: Chin-Wen Chou, Hsin-Tien (TW); Eddie Cheng, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 10/423,915

(22) Filed: Apr. 28, 2003

(51) Int. Cl.⁷ .............................................. G09G 3/10
(52) U.S. Cl. ................................ 315/169.3; 315/169.1; 313/483
(58) Field of Search .......................... 315/169.1, 169.3, 315/169.4, 224, 307, 291; 313/483, 500, 486; 345/102

(56) References Cited

U.S. PATENT DOCUMENTS 6,288,496 B1 * 9/2001 Suzuki et al. ............ 315/169.3
6,570,344 B2 * 5/2003 Lin ............................. 315/224

* cited by examiner

*Primary Examiner*—James Vannucci
*Assistant Examiner*—Jimmy T. Vu
(74) *Attorney, Agent, or Firm*—Birch, Stewart, Kolasch & Birch, LLP (57) ABSTRACT

A current/charge leakage balancing device is used to balance the current/charge leakage that occurs between the display and the backlight module due to the parasitic capacitance effects. The current that respectively flows through each lamp is thereby balanced, which enables to maintain uniform lamp sources and provides uniform brightness of the display panel.

14 Claims, 9 Drawing Sheets

CURRENT AND CHARGE LEAKAGE BALANCING DEVICE FOR DISPLAY PANEL

FIELD OF THE INVENTION

The invention relates to a current/charge leakage balancing device for display panel and, more particularly, a device that can eliminate and balance the residual charges between the lamps of the display panel module and the external metallic shield.

BACKGROUND OF THE INVENTION

Figure 1:
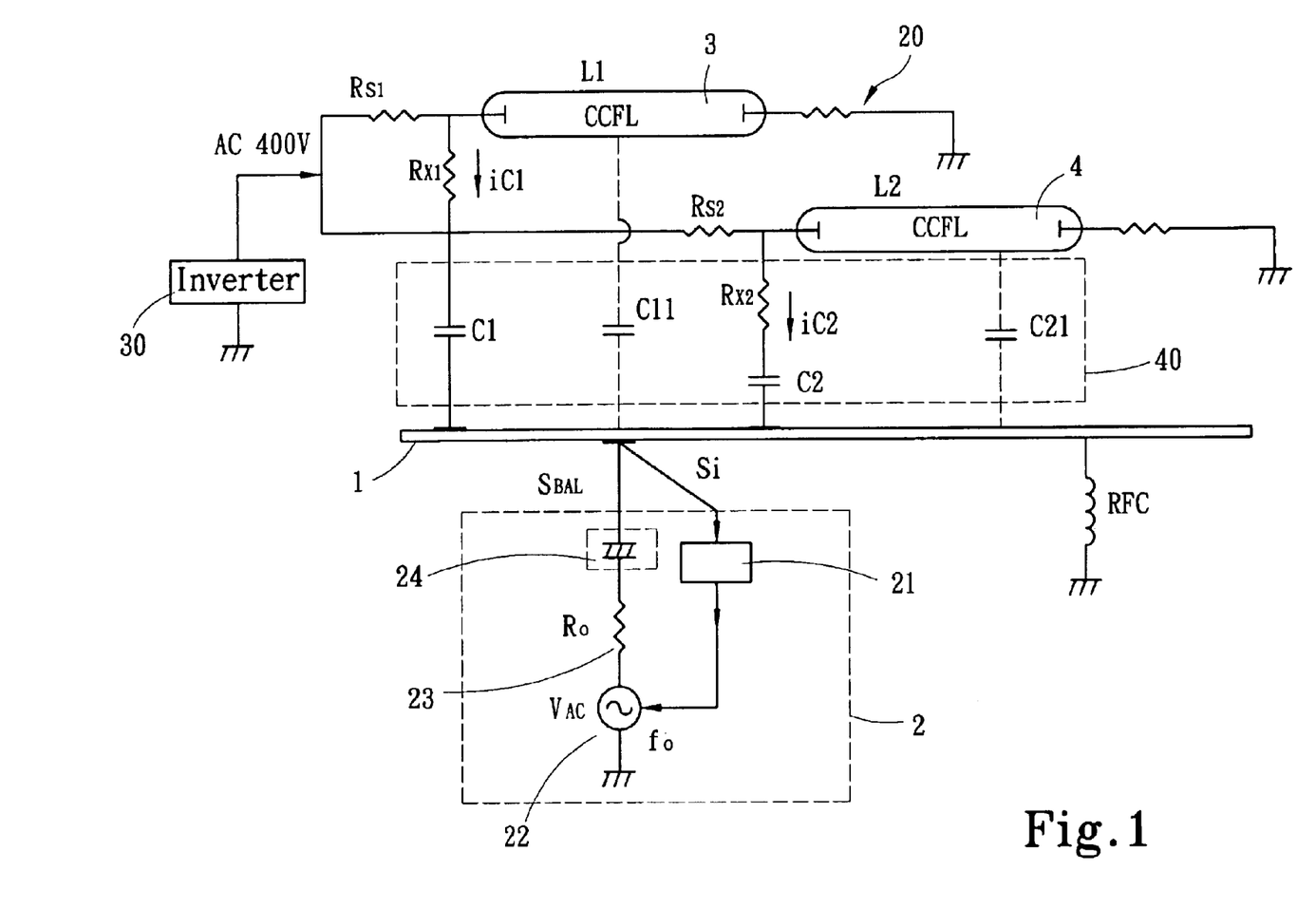
FIG. 1 is a circuit diagram of the connection between the display and the backlight module according to an embodiment of the invention.

A display device such as a liquid crystal display device is usually provided with a backlight radiating source formed by a plurality of lamps. As illustrated in FIG. 1, Rs1/Rs2 are linear resistors (not necessarily identical). Meanwhile, C1, C2 are the principal equivalent stray capacitors of the lamps (not necessarily identical). Due to several factors such as fabrication factors, structure factors, or wiring factors, C1 and C2 usually are not balanced. Rx1, Rx2 represent the serial resistors of the equivalent stray capacitors. Because the backlight lamps usually need high frequency, high-voltage supply inverter, the equivalent circuit corresponding to the stray parasitic effects becomes more complex, and does not provide uniform and balanced allocation. The lamp currents that respectively pass through L1, L2 therefore are not uniform due to the parasitic effects. As a result, the brightness and the gray scale of the display panel are not uniform and balanced, which not only alters the display quality, but also may undesirably affect the user's sight.

SUMMARY OF THE INVENTION

It is therefore an object of the invention to provide a waveform signal generator that can overcome the above disadvantages, and eliminate and balance the residual current and charges of the display panel.

To achieve the above and other objectives, the waveform signal generator of the invention is connected, either directly or through a cross-link element, to an external metallic shield of the display panel or a central layer of plastics. The waveform signal generator injects a signal to the central layer of plastics so as to eliminate and balance the residual current and charge of the display panel.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

Referring to FIG. 1, a circuit diagram schematically illustrates an embodiment of the invention. As illustrated, the current (or charge) leakage balancing device for display panel can effectively neutralize the current/charge leakage effect that occurs between the display device and the backlight module due to parasitic capacitance. By eliminating the imbalance effects due to current leakage, the electric current that flows through each lamp therefore can produce uniform brightness over a large area of the display panel.

To accomplish the above purpose, a waveform signal generator 2 is connected on either a central layer of plastics material 40 or an external metallic shield 1 outside the display panel 20. The waveform signal generator 2 is used to balance the current/charge leakage, and comprises a signal calculate function loop 21, a frequency-constant (root mean square) waveform generator loop 22, a signal generator loop output resistor 23, and a balance signal injection coupled element 24 (capacitor, voltage adapter, battery, or direct injection).

First, leakage currents ic1+ic2+ ... + are obtained from the current Si. Because the output of the driving inverter (adapter) 30 is a high voltage (some hundreds of volts) at a high frequency of 10 KHz, an imbalanced voltage takes place at the RFC or the equivalent output resistor (Rc) 23. In addition, phase and signal retardations may occur between each of the currents ic1, ic2, which causes the signal formed after waveform synthesis to be phase retarded in respect of the signal entering the lamps 3, 4, and even having an amplitude error. This dephase effect usually produces a low-frequency parasitic effect or electric signal leakage.

The signals obtained from Si are inputted to the signal calculate function loop 21, which circuit constitutes a controlled voltage generator. The initial voltage is 0V. At this time, because Si delivers imbalanced signals, the circuit therefore continuously increases voltage. The controlled voltage adds to the waveform signal generator 2, which is a controlled voltage variable frequency generator. At 0V, the generator 2 becomes a very low frequency signal input. When the inputted controlled voltage continuously increases, the output frequency of the waveform signal generator 2 also progressively increases until the signal frequency and the low frequency due to the aforementioned dephase effect are uniform. At this time, the leakage current that is created under $V_{AC}$ and passes through the output resistor 23 and the balance signal injection coupled element 24 to the external metallic shield 1 is balanced, which causes Si signal to progressively approach zero (or the minimum).

Because the phase split balance of the balanced signal inputted from $S_{BAL}$ to the external metallic shield 1 is decomposed into ic1 and ic2, the leakage current of ic1 and ic2 having been balanced or eliminated, the signal of Si will reach a minimum at a certain frequency output balance signal. At the minimum of Si, the signal calculate function loop 21 fixes the output controlled voltage. As a result, the output of the generator 2 thoroughly tracks a reference frequency to maintain Si minimum, i.e. maintain the parasitic capacitance C1+C2+C3 . . . at neutralized or balanced state.

Because the leakage current that flows through the parasitic capacitors C1, C2, etc. are neutralized by the device of the invention, the current passing through the lamps 3, 4 therefore are not interfered and can be maintained uniform in a balanced state. The surface of the whole display therefore can obtain uniform brightness and gray scale, which improves the quality of the display device.

Figure 2A:
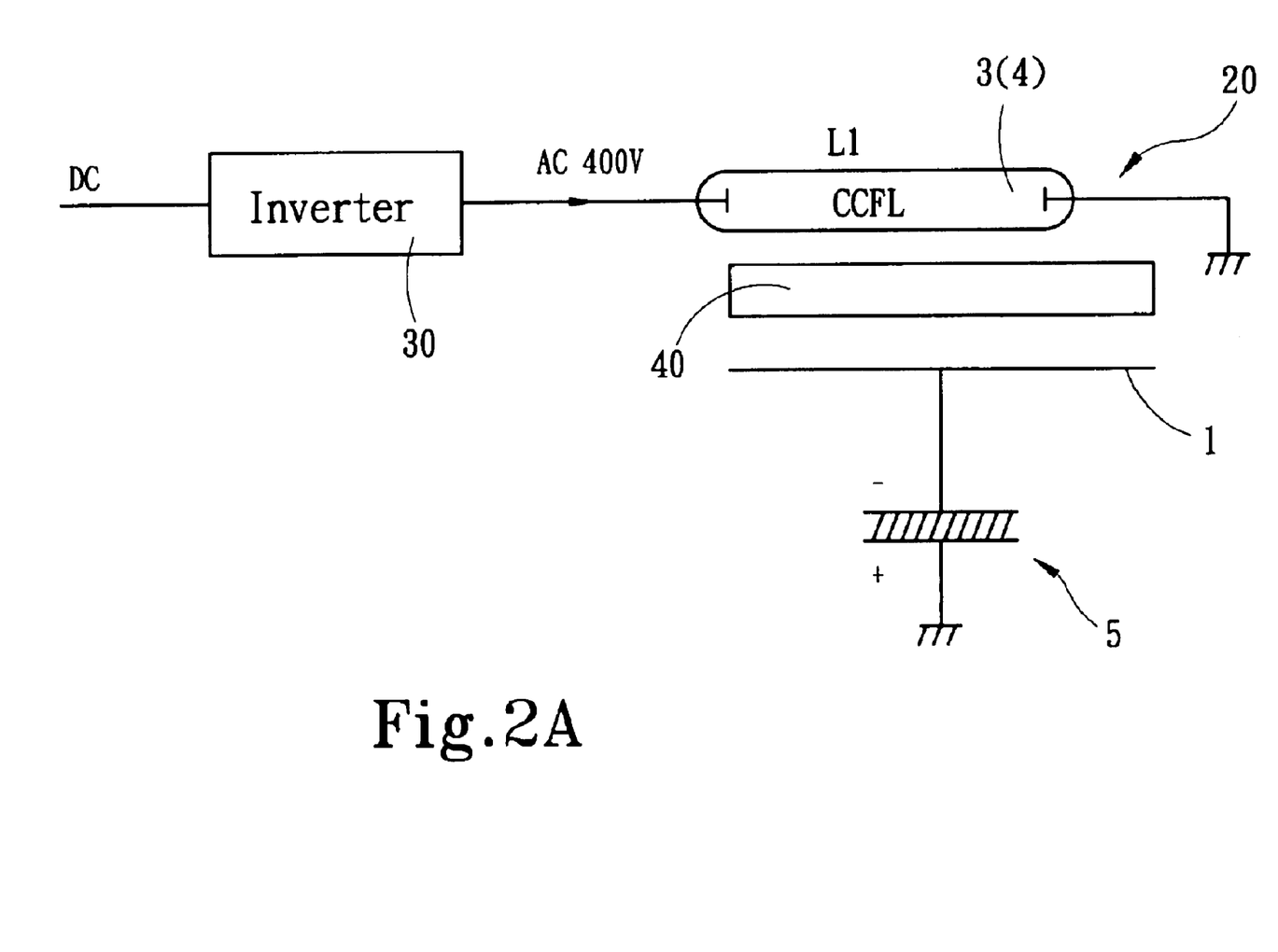
FIG. 2A is a schematic view of a passive-type embodiment of the invention.
Figure 2B:
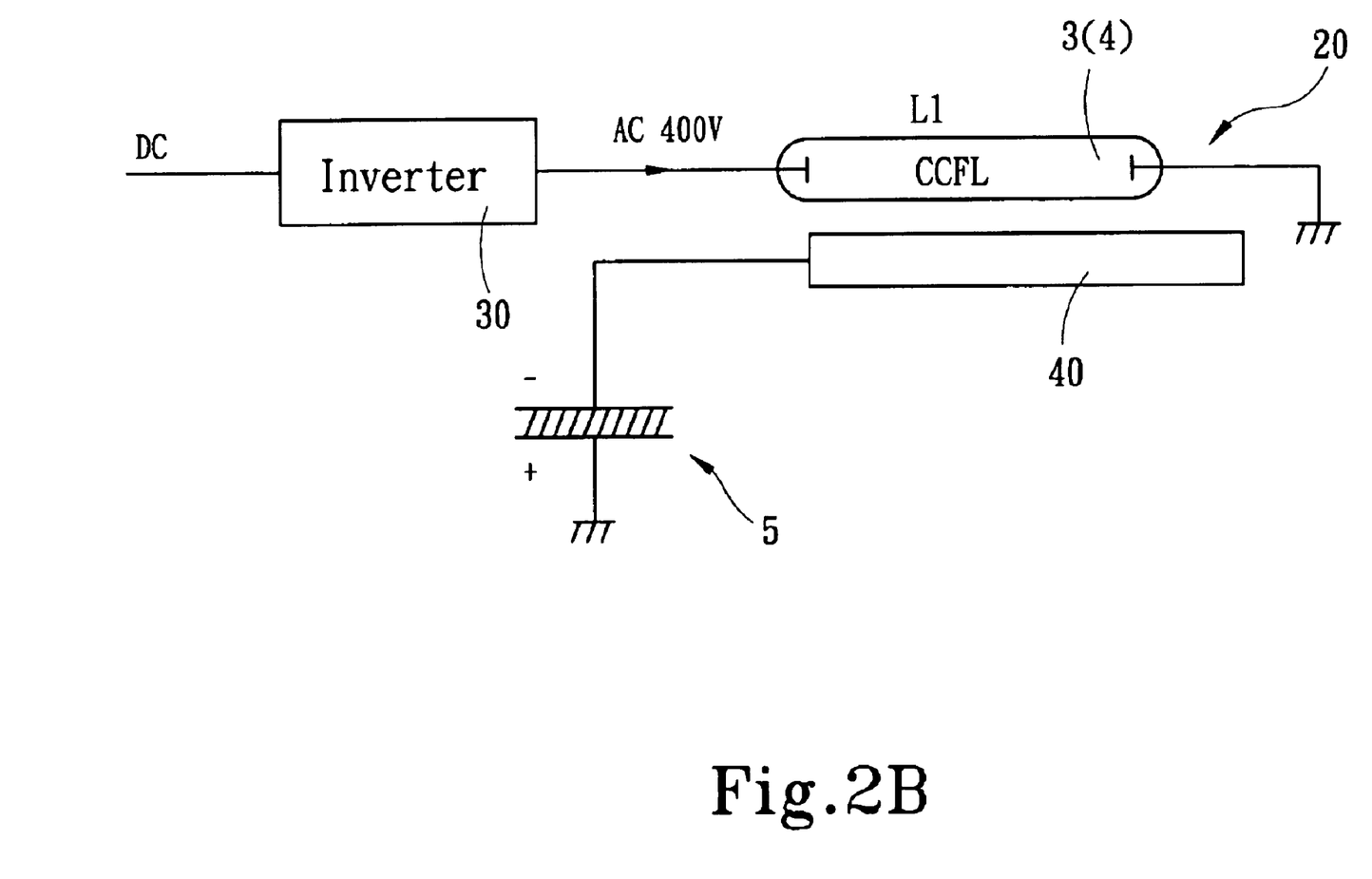
FIG. 2B is a schematic view of a variant passive-type embodiment of the invention.

FIGS. 2A and 2B illustrate other passive type embodiments of the invention. As illustrated, the embodiments of FIGS. 2A and 2B are very similar to the above description. A difference lies in that a cross-link element 5 is connected to the external metallic shield 1 or central layer of plastics material 40. The cross-link element 5 may be a capacitor, an inductor, or a voltage adapter. If connected to the capacitor, the element 5 will receives the influence of the positive and negative electrode of the capacitor, and the LOW ESR (equivalent serial resistor) is optimal.

Figure 3:
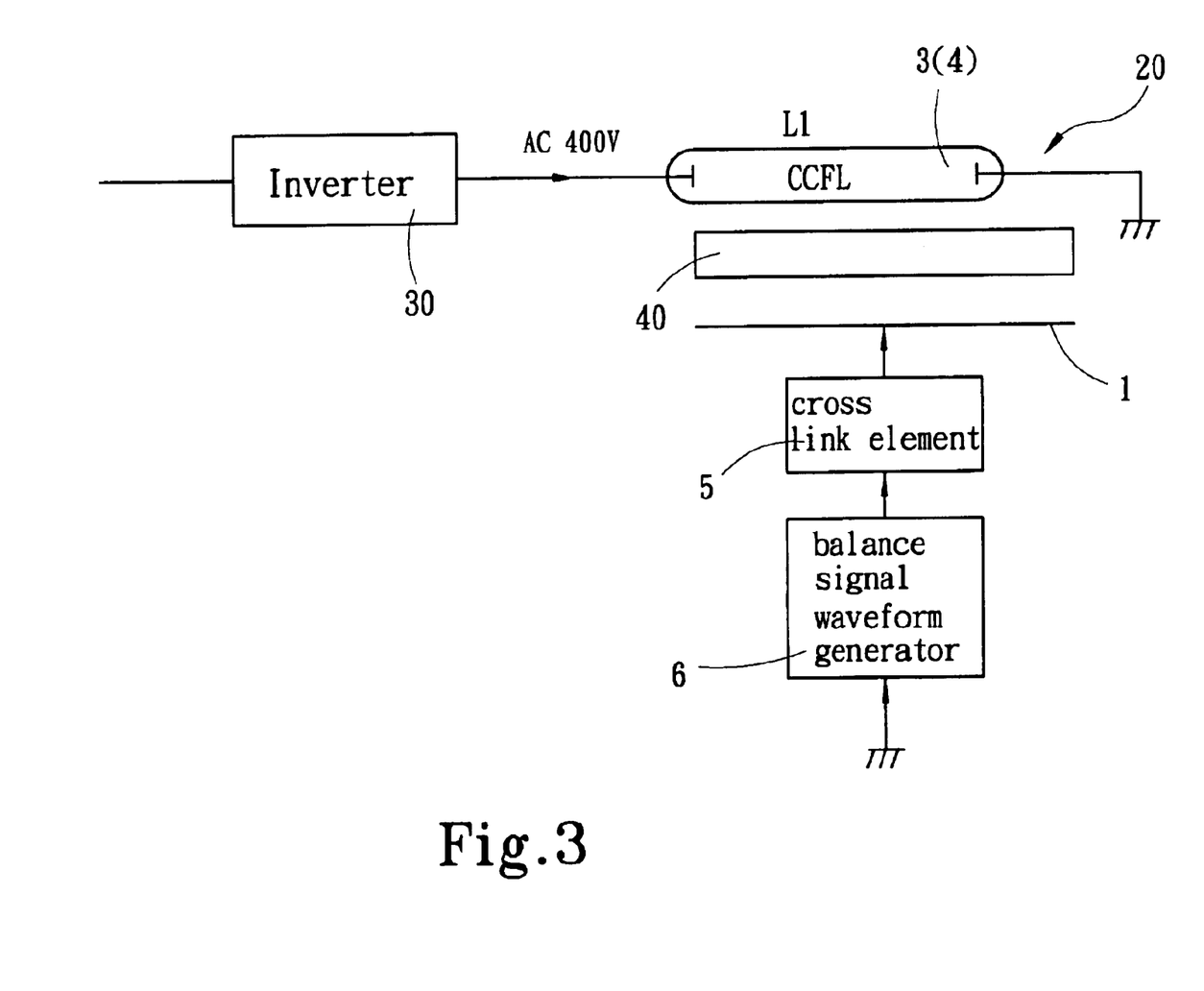
FIG. 3 is a schematic view of an active-type embodiment of the invention.
Figure 4:
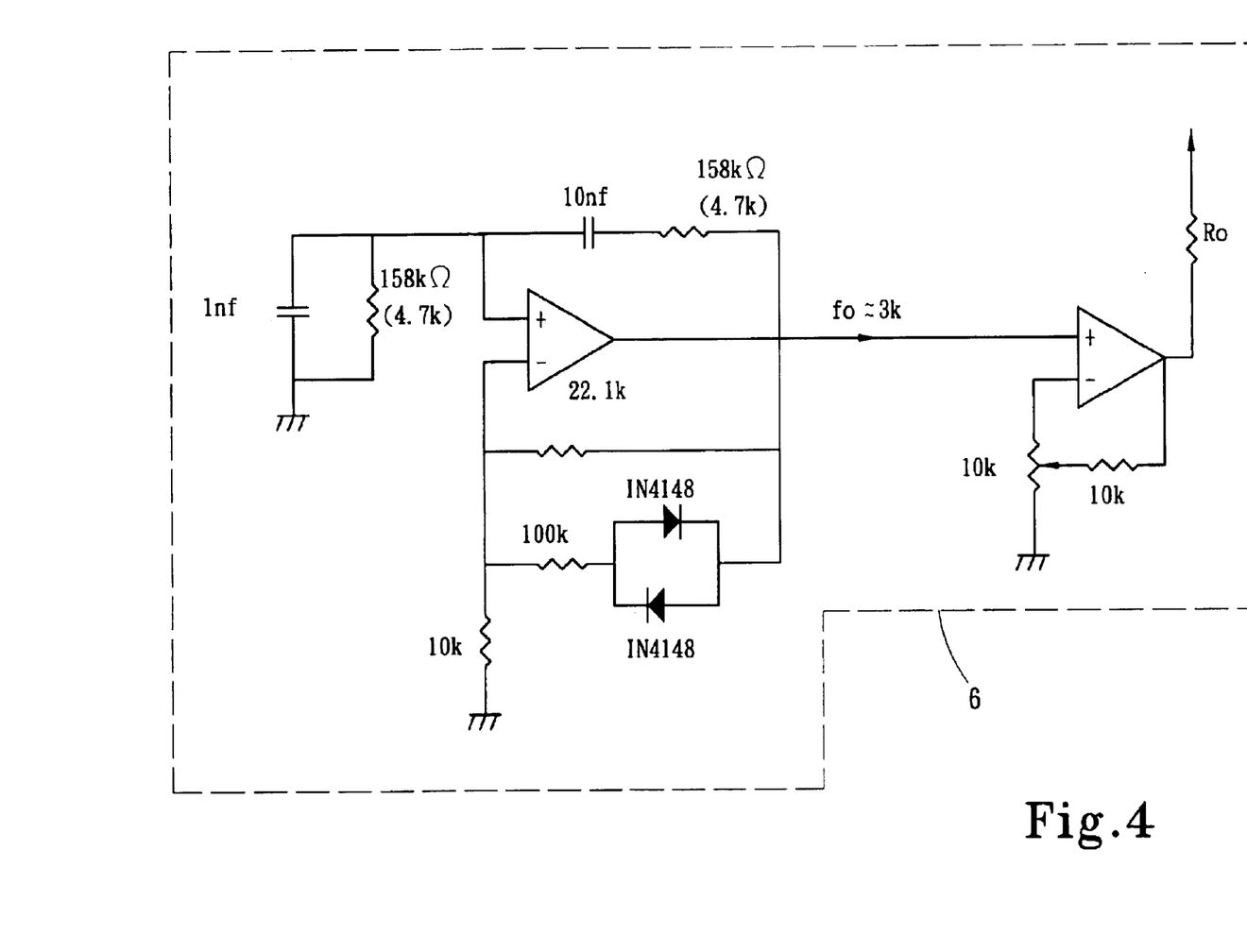
FIG. 4 is a circuit diagram showing an implementation of FIG. 3.

FIG. 3 and FIG. 4 illustrate other active type embodiments of the invention. These other embodiments are very similar to the aforementioned embodiments. A difference is that the cross-link element 5 is connected to a balance signal waveform generator 6. This generator 6 provides a gain and a higher current to fix the waveform signal injection (the waveform signal can be injected in the external metallic shield 1 or central layer of plastics material 40). Though the waveform signal has been described as having constant frequency and amplitude, but it alternatively may be multi-phase, multi-frequency, multi-amplitude, etc., to eliminate the leakage current.

Figure 5:
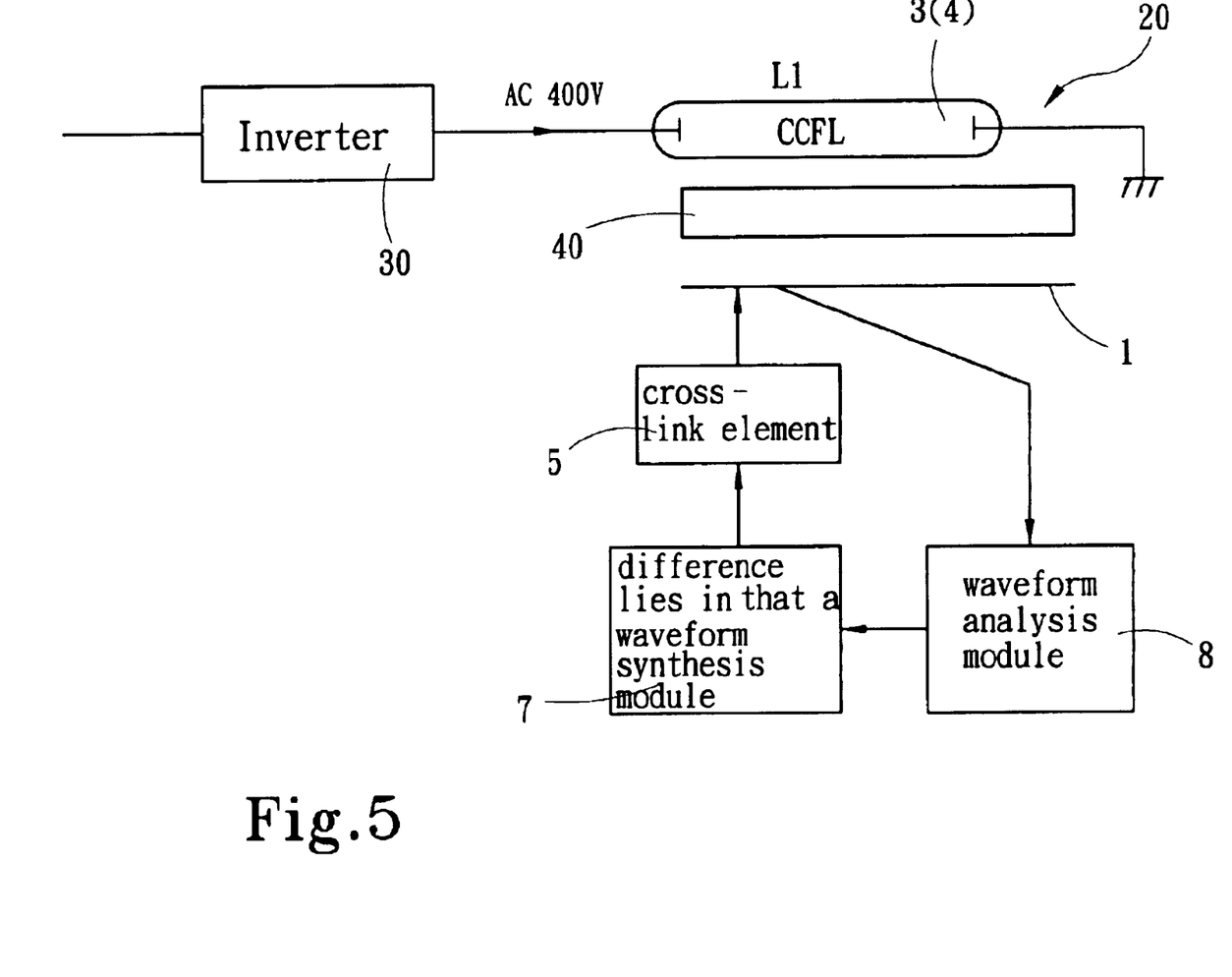
FIG. 5 is a schematic view of a second active-type embodiment of the invention.
Figure 6:
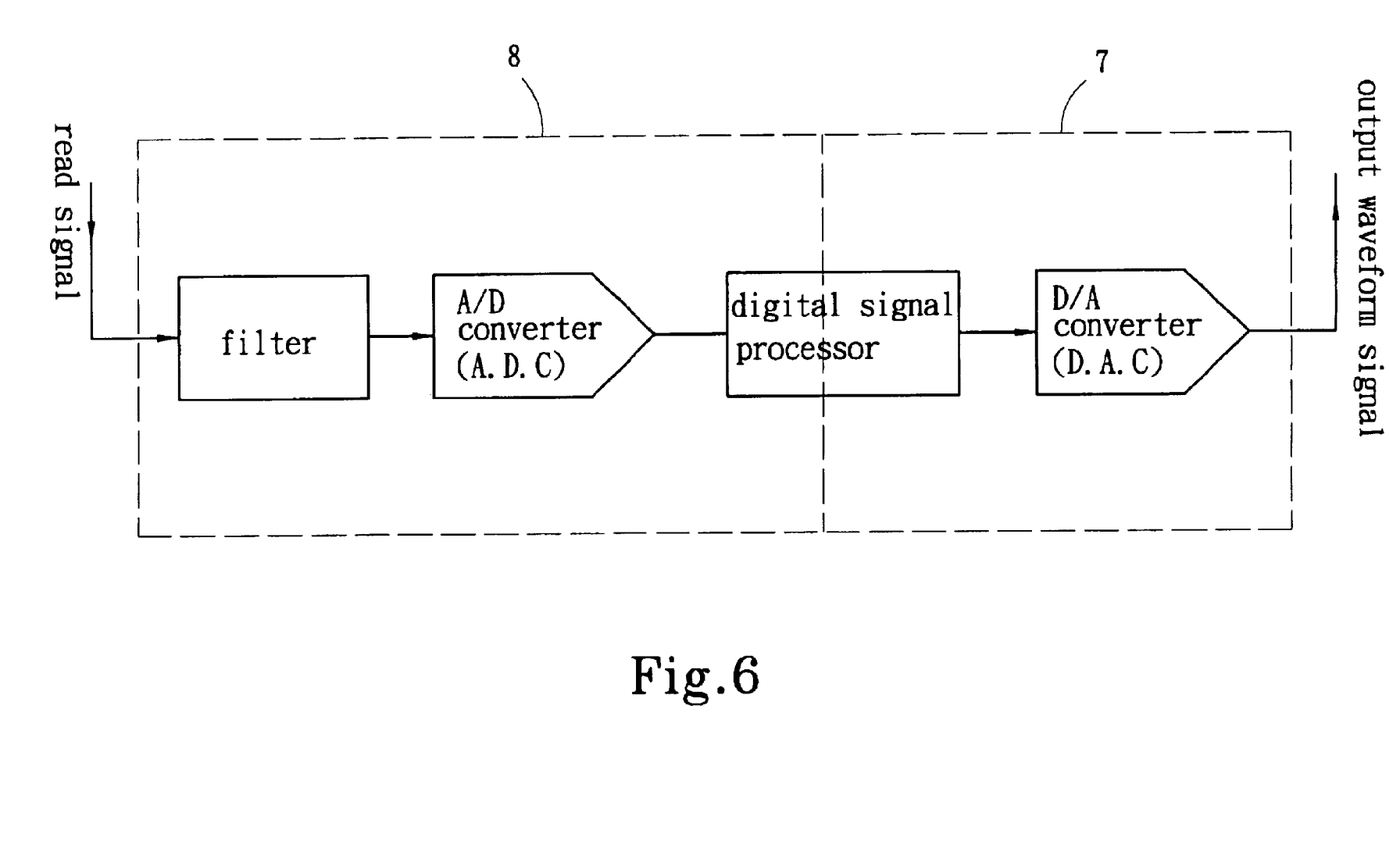
FIG. 6 is a circuit diagram showing an implementation of FIG. 5.
Figure 7:
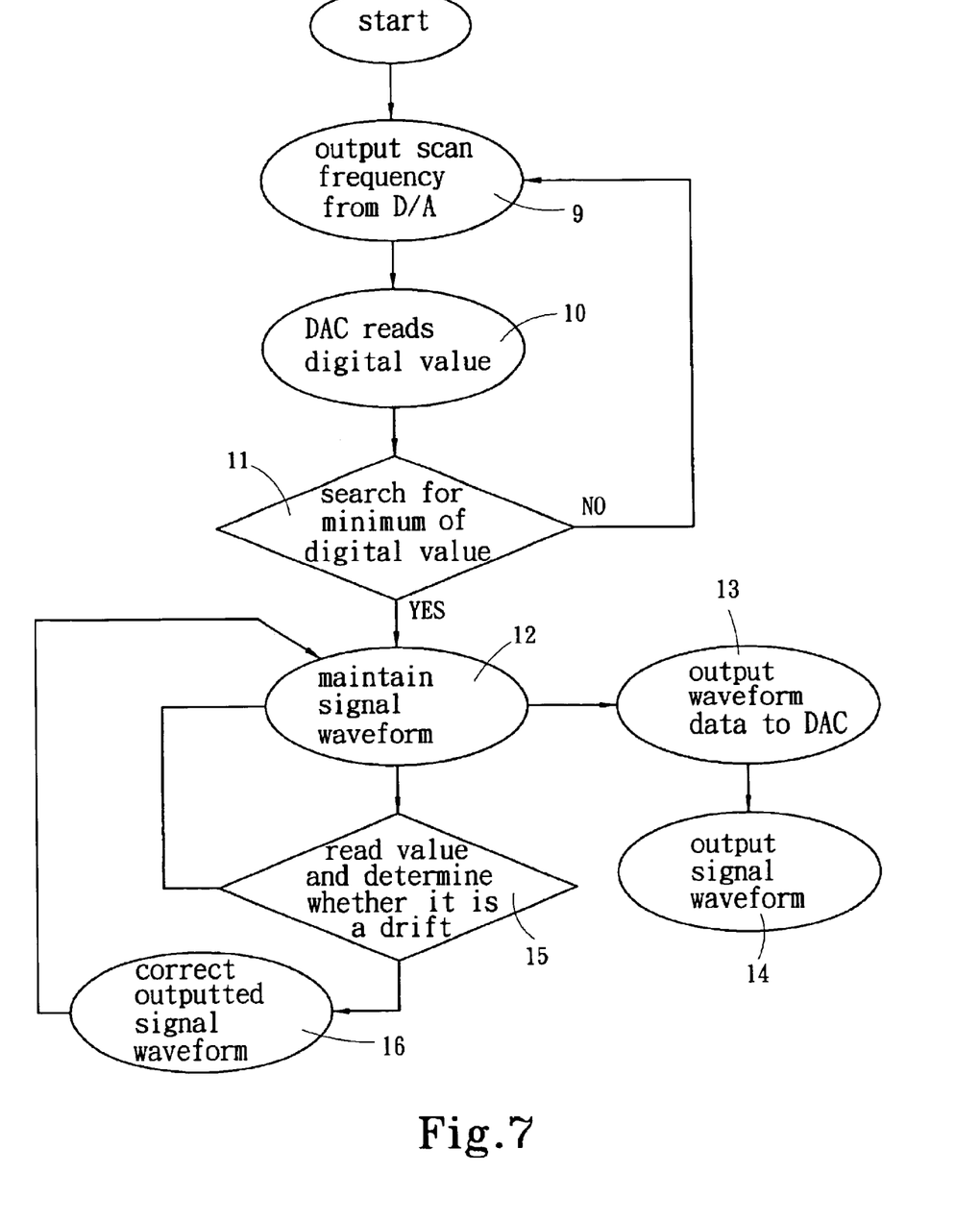
FIG. 7 is a flow chart showing the manipulation method of FIG. 5.

FIGS. 5, 6 and 7 describe variant active-type embodiments and the operating steps thereof according to the invention. These variant embodiments are very similar to the aforementioned embodiments. The difference lies in that a waveform synthesis module 7 and a waveform analysis module 8 are connected between the cross-link element 5 and the external metallic shield 1.

When being activated, the above two modules output a scanning frequency 9 (produced from the DAC). The ADC then reads the feedback signal 10, and determines the minimum 11 of the feedback signal. If it is not the minimum, return to step 9. If it is the minimum, then the signal waveform is maintained (step 12) and its data is delivered to the DAC (step 13). Subsequently, the signal waveform is outputted (step 14). Alternatively, it is determined whether the feedback signal is a drift (step 15). If it is not a drift, then return to step 12, otherwise the outputted signal waveform is corrected (step 16), and then return to step 12.

Figure 8:
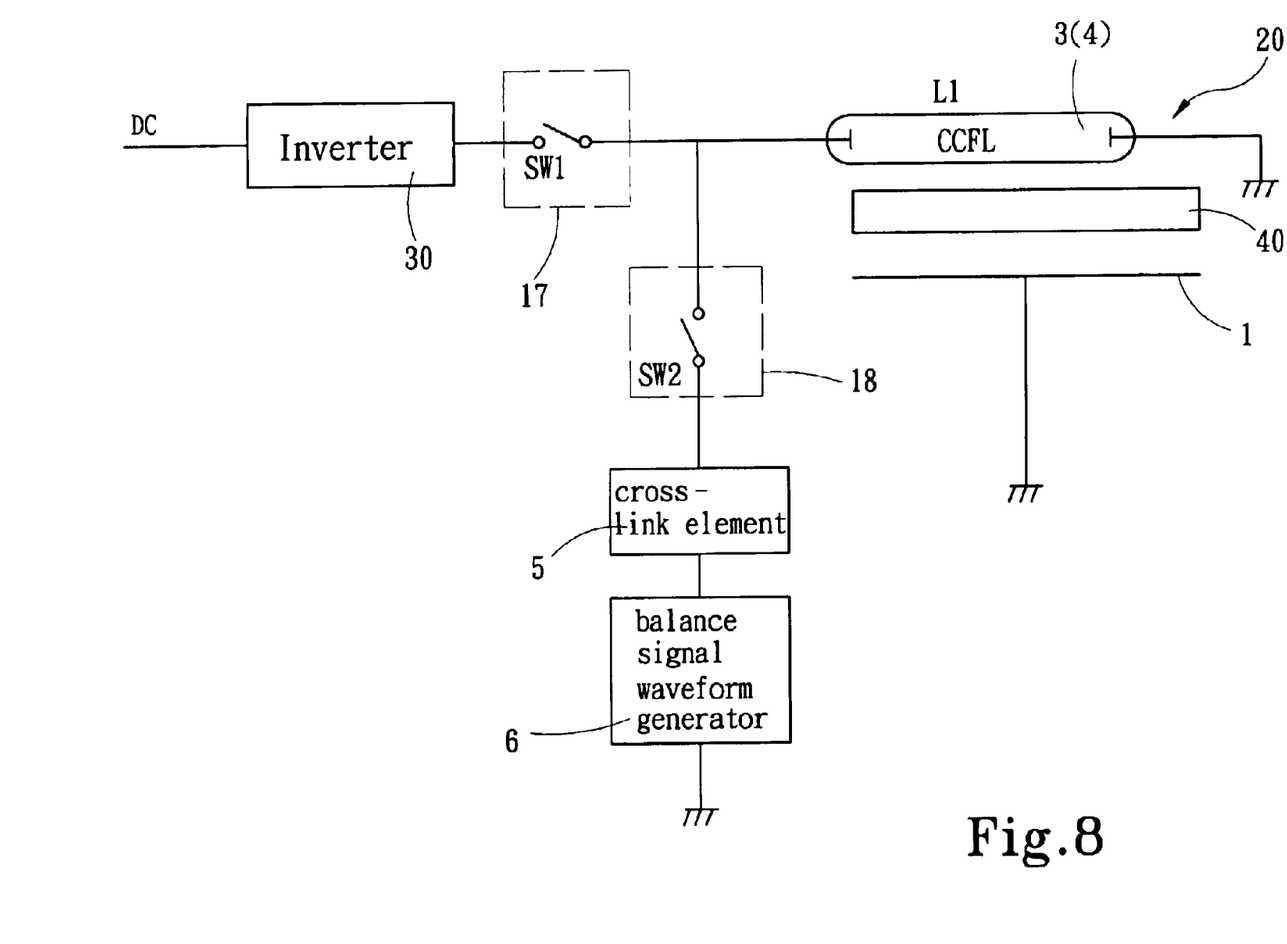
FIG. 8 is a schematic view illustrates a front stage injection-type embodiment of the invention.

Referring to FIG. 8, a schematic view illustrates a front stage injection-type embodiment of the invention. As illustrated, a first switch 17 and a second switch 18 may be directly connected between the front side of the display panel 20 and the inverter 30. The second switch 18 further is serially connected to the cross-link element 5 and the balance signal waveform generator 6. The first and second switches 17, 18 can be high-voltage switching elements such as MOS or other passive devices, which uses time division or phase division to eliminate or balance the residual charges of the display panel 20.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A current leakage balancing device for display panel, comprising:

an inverter and a display panel module having a lamp, used to eliminate or balance residual electrical charges between the lamp and an external metallic shield, wherein the balancing device is directly connected on the external metallic shield in a manner to directly inject a waveform signal on the external metallic shield, thereby eliminating or balancing the residual electrical charges of the display panel, the balancing device is directly connected between the display panel module and the inverter, and uses time division or phase division to eliminate or balance the residual electrical charges of the display panel.

2. The device of claim 1, wherein the balancing device is a waveform signal generator.

3. The device of claim 2, wherein the waveform signal generator comprises a signal calculate function loop, a frequency-constant waveform generator loop, a signal generator loop output resistor, and a balance signal injection coupled element.

4. The device of claim 3, wherein the coupled element is a capacitor, an inductor, a voltage adapter, or a battery.

5. The device of claim 1, wherein the balancing device is a passive device.

6. The device of claim 5, wherein the passive device is cross-link element.

7. The device of claim 6, wherein the cross-link element is a capacitor.

8. The device of claim 1, wherein the balancing device is an active device that constantly injects the waveform signal, wherein the waveform signal is at a constant frequency and amplitude, multi-phase, multi-frequency, or multi-amplitude.

9. The device of claim 8, wherein the active device is formed from the connection of a cross-link element with a balance signal waveform generator.

10. The device of claim 8, wherein the active device is a cross-link element, a waveform synthesis module, or a waveform analysis module.

11. The device of claim 1, wherein the balancing device is directly connected on a central layer of plastics of the display panel module.

12. The device of claim 1, further comprising a first switch and a second switch, the second switch being connected to the cross-link element and the balance signal waveform generator.

13. The device of claim 12, wherein the first and second switches are high-voltage switching elements, including MOS or passive devices.

14. The device of claim 1, wherein the inverter is a voltage adapter.

* * * * *